(12) United States Patent
Okuzaki et al.

(10) Patent No.: US 8,289,423 B2
(45) Date of Patent: Oct. 16, 2012

(54) SOLID-STATE IMAGING DEVICE, METHOD FOR DRIVING THE SAME, AND CAMERA SYSTEM

(75) Inventors: Yoko Okuzaki, Kanagawa (JP); Tomokazu Kakumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 12/659,428

(22) Filed: Mar. 9, 2010

(65) Prior Publication Data

US 2010/0271526 A1 Oct. 28, 2010

(30) Foreign Application Priority Data

Apr. 24, 2009 (JP) .................................. 2009-107141

(51) Int. Cl.
*H04N 3/14* (2006.01)
*H04N 5/335* (2011.01)
(52) U.S. Cl. ........ 348/294; 348/298; 348/302; 348/308; 348/312
(58) Field of Classification Search .......... 348/294–324; 250/208.1; 257/290–292
See application file for complete search history.

(56) References Cited

U.S. PATENT DOCUMENTS

2006/0243883 A1* 11/2006 Yahazu et al. ............. 250/208.1

* cited by examiner

*Primary Examiner* — Yogesh Aggarwal
(74) *Attorney, Agent, or Firm* — Rader Fishman & Grauer, PLLC

(57) ABSTRACT

A solid-state imaging device includes: a pixel unit in which pixels, each of which converts light into a pixel signal and accumulates the pixel signal in accordance with a light exposure period, are arranged in a predetermined color layout and first-color pixel horizontal rows containing first-color pixels and second-color pixel horizontal rows containing second-color pixels are alternately arranged in a vertical row direction; readout units that select n (n≧2) single-color pixel signals from the first-color or second-color pixels in the first-color or second-color pixel horizontal rows, perform 1/n thinning-out on the selected n pixel signals to reduce the number of pixel signals to 1/n, and read the resultant pixel signal for each of the colors; and column processing units that perform column processing on the pixel signals having undergone the 1/n thinning-out.

20 Claims, 13 Drawing Sheets

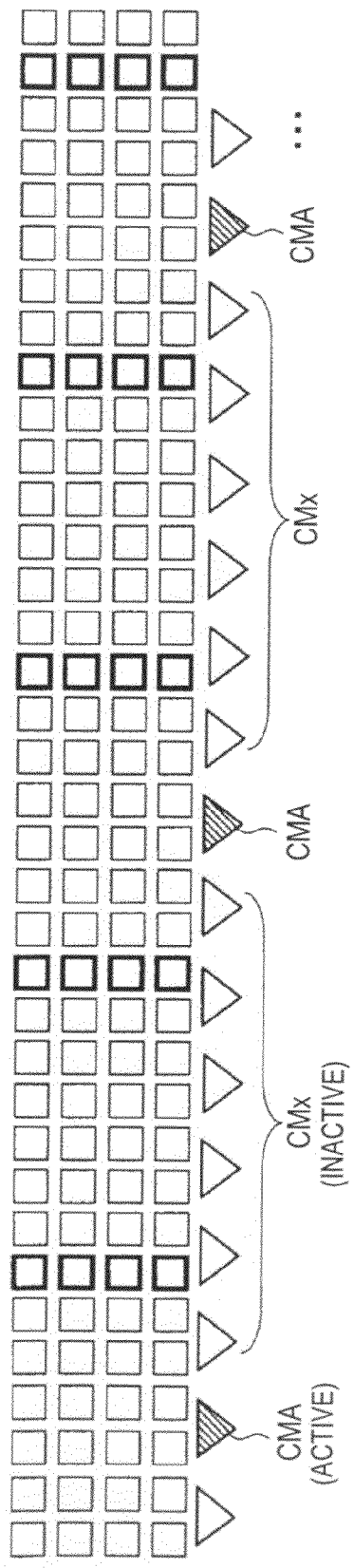

SOLID-STATE IMAGING DEVICE, METHOD FOR DRIVING THE SAME, AND CAMERA SYSTEM

BACKGROUND OF THE INVENTION

1. Field of the Invention

The present invention relates to a solid-state imaging device represented by a CMOS image sensor, a method for driving the same, and a camera system.

2. Description of the Related Art

In recent years, CMOS image sensors have captured attention as a solid-state imaging device (image sensor) that replaces CCDs. CCD pixels typically require dedicated processes in manufacture and using a plurality of power source voltages and combining a plurality of peripheral ICs in operation. The various problems, such as a significantly complicated system, associated with a CCD can be overcome by using a CMOS image sensor.

A CMOS image sensor can be manufactured by using processes similar to those used to manufacture a typical CMOS integrated circuit. Further, a CMOS image sensor can be driven by a single power source and mixed with analog and logic circuits manufactured by using CMOS processes into a single chip. A CMOS image sensor therefore has a plurality of significant advantages, such as decrease in the number of peripheral ICs.

An output circuit dominantly used with a CCD is a single-channel (ch) output circuit using an FD amplifier including a floating diffusion (FD) layer. In contrast, a CMOS image sensor inherently includes an FD amplifier on a pixel basis. A dominantly used FD amplifier is a vertical row parallel output amplifier, in which a single horizontal row in a pixel array is selected and the entire horizontal row is read all together in the vertical row direction. It is difficult for an in-pixel FD amplifier to provide a sufficient drive capability and therefore necessary to reduce the data rate. This is a reason why a CMOS image sensor is advantageously operated in a parallel processing scheme.

Not only in CCD and CMOS image sensors but also in any imagers, different multiple color pixels, which is a minimum unit repeated in a color layout, forms a pixel unit, and the color layout of the pixel unit is determined by arranging the set of multiple pixels in a horizontal row-vertical row matrix or a checkered pattern. A minimum unit to which a single color is assigned in the pixel unit is called a sub-pixel, and a set of different color sub-pixels is called a pixel in some cases. In the following description, however, a minimum unit to which a single color is assigned is called a pixel, and a set of different color pixels, which is repeated to form a color layout, is called a pixel unit.

In general, in a vertical row parallel output-type CMOS image sensor, a parallel processed unit in the pixel unit, which is called a column, is a vertical pixel-unit row, and a processing circuit is provided for each vertical row of pixels or column. The processing circuit for each vertical row of pixels or column includes a noise removal circuit using CDS or any other suitable method or, when what is called a column-AD scheme is used, a single-bit ADC (analog-digital converter).

In a vertical row parallel output-type CMOS image sensor, entire pixel signals can be read, as in the other output-type image sensors. Further, thinning-out reading, in which the frame rate is increased by limiting the pixels to be read to reduce the number of data (the number of pixel signals) to be outputted from the pixel unit, can be carried out.

In the thinning-out reading, the amount of information decreases because one out of n (at least two) pixel signals is read and the other pixel signals are discarded. It is therefore a typical practice to sum a plurality of pixel signals before reading. In the following description, a method for simply selecting and reading one of the n pixel signals is referred to as thinning-out reading and a thinning-out method along with summing is referred to as summing and reading.

FIG. 1 is a diagrammatic view showing a pixel unit formed in what is called a Bayer layout with a column processing circuit disposed on a column basis.

In a Bayer layout, red (R) and green (Gr) are alternately arranged in a first-color pixel horizontal row, which is what is called an R horizontal row, and green (Gb) and blue (B) are alternately arranged in a second-color pixel horizontal row, which is what is called a B horizontal row. A pixel unit is formed of red (R), green (Gr), green (Gb), and blue (B) four pixels in two horizontal rows and two vertical rows.

Each of the triangular blocks shown in FIG. 1 is a first-stage processing unit in the corresponding column processing circuit, and corresponds to, for example, a comparator in an ADC that operates in a column-AD scheme. In FIG. 1, the column processing circuits are arranged in the respective columns, that is, one per vertical row of pixel units.

FIGS. 2A and 2B shows exemplary operations in which a first-color pixel horizontal row (R horizontal row) and a second-color pixel horizontal row (B horizontal row) are processed by using different column processing circuits. In FIGS. 2A and 2B, each of the reference characters "17R" denotes a first stage (comparator, for example) of the corresponding column processing circuit for R horizontal rows, and each of the reference characters "17B" denotes a first stage (comparator, for example) of the corresponding column processing circuit for B horizontal rows. In FIGS. 2A and 2B, only the pixels to be summed are labeled with their color codes (R, Gr, Gb, and B).

In a first summing and reading operation shown in FIG. 2A, three green (Gb) pixel signals from a first horizontal row B1 are summed and read to the first stage 17B of the corresponding column processor. Similarly, three red (R) pixel signals from a first horizontal row R1 are summed and read to the first stage 17R of the adjacent column processor.

In the following summing and reading operation shown in FIG. 2B, three blue (B) pixel signals from the first horizontal row B1 are summed and read to the corresponding first stage 17B, and three green (Gr) pixel signals from the first horizontal row R1 are summed and read to the corresponding first stage 17R.

The drive method described above is a known method in which when an R horizontal row is read in a horizontal summing or thinning-out operation, the column located at the summing center in the R horizontal row is used, and when a B horizontal row is read, the column located at the summing center in the B horizontal row is used. In this case, the column used for the R horizontal row differs from the column used for the B horizontal row.

SUMMARY OF THE INVENTION

In the drive method described above, however, it is necessary to always drive two out of every three column processing circuits provided for the respective columns when summing and reading is carried out, disadvantageously resulting in increased power consumption.

Further, the three pixels to be summed in a red (R) or blue (B) summing and reading operation and the three pixels to be summed in a green (Gr) or green (Gb) summing and reading operation are positioned asymmetrically with respect to the first stages 17R and 17B to which the pixel readings are directed. The asymmetric positioning, for example, disadvantageously causes a slight difference in phase of the pixel signals inputted to the first stages 17R and 17B due to wiring delay and other factors.

Thus, it is desirable to provide a solid-state imaging device capable of reducing the number of operating column processing units to reduce power consumption and ensuring symmetry between the centers of the pixels that undergo 1/n thinning-out with respect to the column processing unit to which the thinned-out pixel signal is outputted. It is also desirable to provide a method for driving the solid-state imaging device capable of reducing power consumption and ensuring the symmetry. It is further desirable to provide a camera system including the solid-state imaging device.

A solid-state imaging device according to an embodiment of the invention includes a pixel unit, readout units, and column processing units.

In the pixel unit, pixels, each of which converts light into a pixel signal and accumulates the pixel signal in accordance with a light exposure period, are arranged in a predetermined color layout and first-color pixel horizontal rows containing first-color pixels and second-color pixel horizontal rows containing second-color pixels are alternately arranged in a vertical row direction. The readout units select n (n≧2) single-color pixel signals from the first-color or second-color pixels in the first-color or second-color pixel horizontal rows, perform 1/n thinning-out on the selected n pixel signals to reduce the number of pixel signals to 1/n, and read the resultant pixel signal for each of the colors. The column processing units perform column processing on the pixel signals having undergone the 1/n thinning-out.

Each of the column processing units works not only as a processing unit that performs column processing on the one first-color pixel signal read by the readout units from the n first-color pixel signals but also as a processing unit that performs column processing on the one second-color pixel signal read by the readout units from the n second-color pixel signals.

In the embodiment of the invention, each of the column processing units is preferably disposed at one end or both ends of a vertical pixel row between summing centers. The vertical pixel row between summing centers used herein is a vertical pixel row positioned between the center of n arranged pixels that output the n first pixel signals selected to be summed and the center of n arranged pixels that output the n second pixel signals.

Alternatively, each of the column processing units is preferably disposed at one end or both ends of a vertical pixel row between a vertical pixel row between pixels having undergone thinning-out and reading. The vertical pixel row between pixels having undergone thinning-out and reading used herein is a vertical pixel row between a vertical pixel row containing a pixel that outputs the one first pixel signal read in the 1/n thinning-out operation and a vertical pixel row containing a pixel that outputs the one second pixel signal read in the 1/n thinning-out operation.

According to the configuration described above, each of the processing units that performs column processing on the one first pixel signal read from any of the first-color pixel horizontal rows also works as the processing unit that performs column processing on the one second pixel signal read from any of the second-color pixel horizontal rows. The power consumption decreases accordingly.

Further, according to the preferred configurations, each of the column processing units is disposed at one end or both ends of a vertical pixel row between summing centers or a vertical pixel row between pixels having undergone thinning-out and reading. As a result, n pixels that undergo 1/n thinning-out (including summing) in any of the first-color or second-color pixel horizontal rows are disposed symmetrically with respect to the column processing unit to which the pixel readings are directed.

A method for driving a solid-state imaging device according to another embodiment of the invention includes the following three steps:

(1) selecting n (n≧2) single-color pixel signals from the first-color or second-color pixels in the first-color or second-color pixel horizontal rows in the pixel unit having the configuration described above, (2) performing 1/n thinning-out on the selected n pixel signals to reduce the number of pixel signals to 1/n and reading the one pixel signal for each of the colors, and (3) performing column processing on the one pixel signal having been read. In this process, a single column processing unit is used to perform the column processing on the one first pixel signal read from the first-color pixel horizontal rows and the column processing on the one second pixel signal read from the second-color pixel horizontal rows.

A camera system according to still another embodiment of the invention includes a solid-state imaging device, an optical system that forms a subject image on the solid-state imaging device, and a signal processing circuit that processes an image signal outputted from the solid-state imaging device.

The solid-state imaging device is configured in the same manner as the solid-state imaging device according to the embodiment of the invention described above.

The embodiments of the invention described above can reduce the number of operating column processing units to reduce power consumption and ensure symmetry between the centers of the pixels that undergo 1/n thinning-out with respect to the column processing unit to which the thinned-out pixel signal is outputted. The embodiments of the invention described above can provide a solid-state imaging device capable of reducing power consumption and ensuring the symmetry, a method for driving the same, and a camera system.

BRIEF DESCRIPTION OF THE DRAWINGS

FIG. 9 describes the arrangement of active comparators for n=7;

DESCRIPTION OF THE PREFERRED EMBODIMENTS

Embodiments of the invention will be described with reference to the drawings of a CMOS image sensor by way of example. The invention is also applicable to a CCD image sensor.

The description will be made in the following order.

1. First embodiment in which the invention is applied to a CMOS image sensor that carries out thinning-out, summing, and reading
2. Second embodiment in which a driving method superior to that in the first embodiment is described
3. Third embodiment in which the invention is applied to a camera system <1. First Embodiment>
[Device Configuration]

Figure 3:
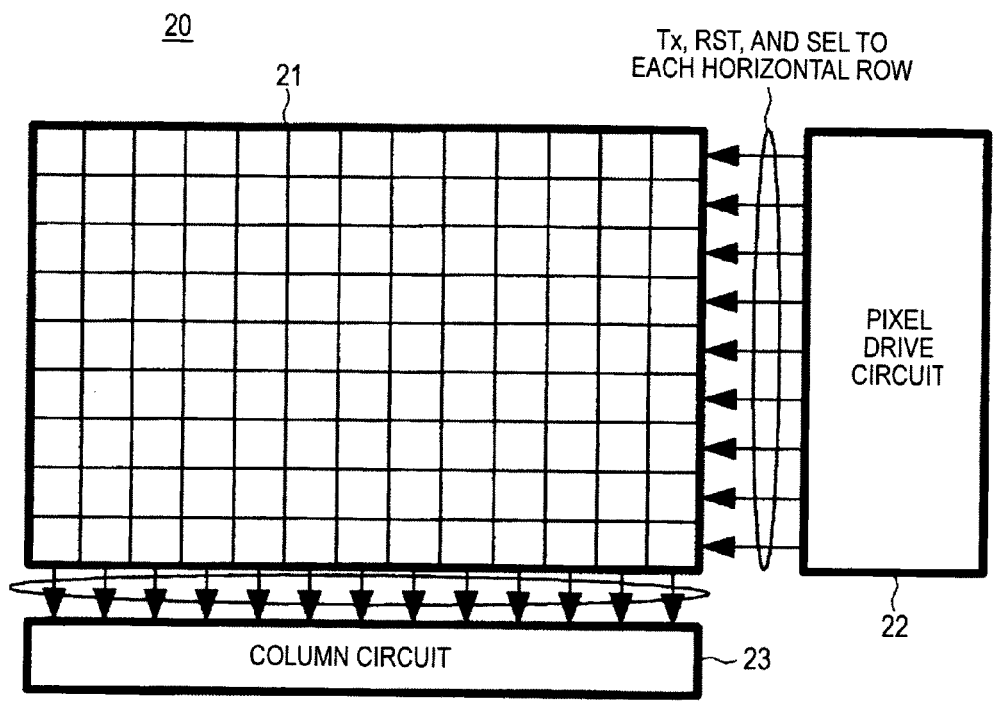
FIG. 3 shows an example of the configuration of a CMOS image sensor (solid-state imaging device) according to an embodiment.

FIG. 3 shows an example of the configuration of a CMOS image sensor (solid-state imaging device) according to an embodiment of the invention.

The CMOS image sensor 20 includes a pixel unit 21, a pixel drive circuit (vertical drive circuit) 22 as a pixel driver, and a column circuit 23.

The pixel unit 21 has a plurality of pixels arranged in a two-dimensional array (matrix). In the pixel unit 21, color pixels, for example, R, Gr, Gb, and B are formed in the layout shown in FIG. 4, that is, a Bayer layout.

Figure 5:
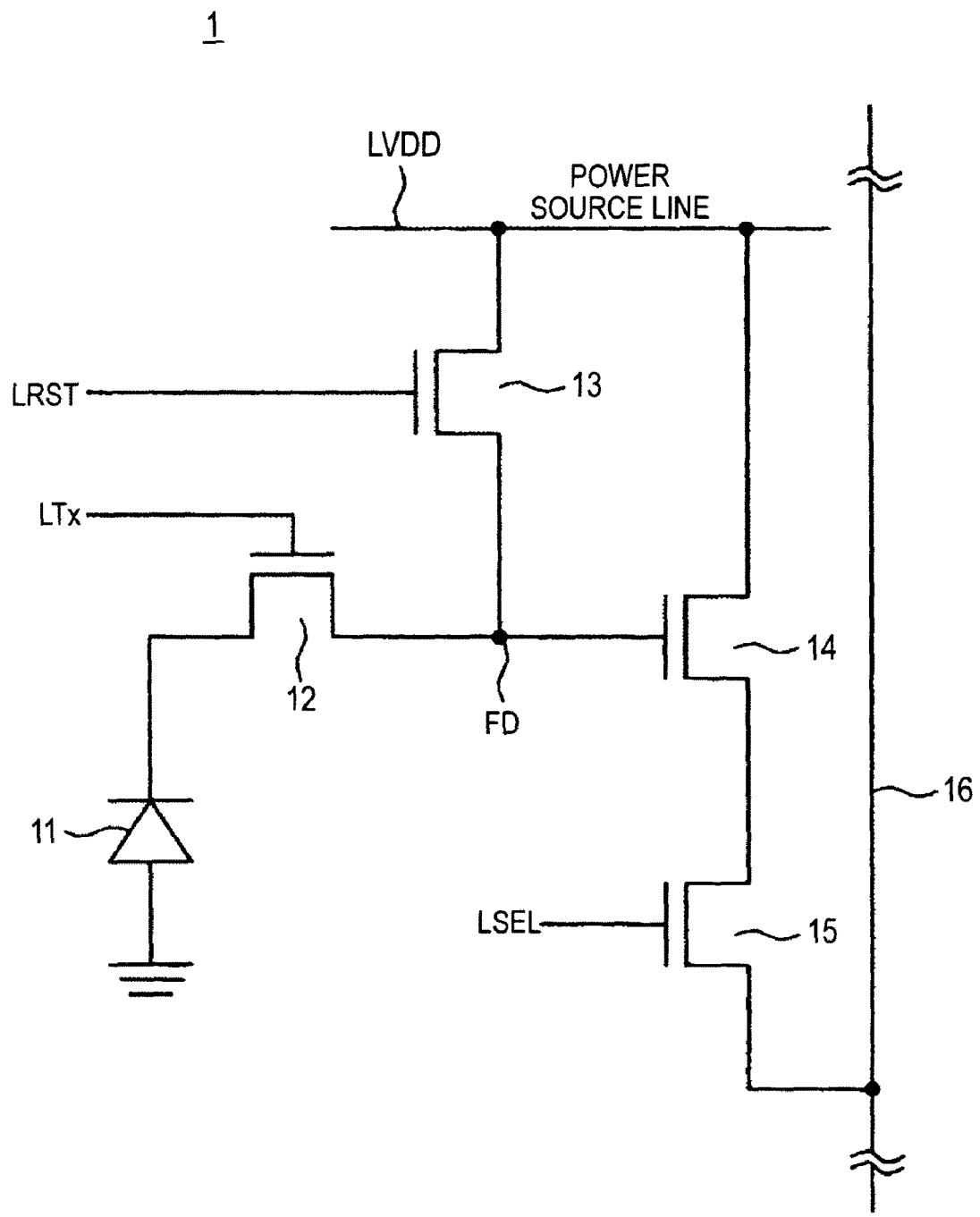
FIG. 5 shows an example of each of the pixels, which is formed of four transistors, in a CMOS image sensor according to the embodiment.

FIG. 5 shows an example of each of the pixels, which is formed of four transistors, in the CMOS image sensor according to the present embodiment.

A pixel 1 illustrated in FIG. 5 includes a photoelectric conversion device 11 formed of, for example, a photodiode. The pixel 1 further includes the following four transistors as active devices per photoelectric conversion device 11: a transfer transistor 12, a reset transistor 13, an amplification transistor 14, and a selection transistor 15.

The photoelectric conversion device 11 photoelectrically converts incident light into electric charge (electrons in the present embodiment) whose amount is determined by the amount of the light. The transfer transistor 12 is connected between the photoelectric conversion device 11 and a floating diffusion FD, and a drive signal is supplied to the gate (transfer gate) of the transfer transistor 12 via a transfer control line LTx. In response to the drive signal, the transfer transistor 12 transfers the electrons photoelectrically converted by the photoelectric conversion device 11 to the floating diffusion FD.

The reset transistor 13 is connected between a power source line LVDD and the floating diffusion FD. The reset transistor 13 resets the potential at the floating diffusion FD to the potential at the power source line LVDD when a reset signal is supplied to the gate of the reset transistor 13 via a reset control line LRST.

The floating diffusion FD is connected to the gate of the amplification transistor 14. The amplification transistor 14 is connected to an output signal line 16 via the selection transistor 15. The amplification transistor 14 and a constant current source outside the pixel unit form a source follower. The selection transistor 15 is turned on when an address signal (select signal) is supplied to the gate of the selection transistor 15 via a selection control line LSEL. At this point, the amplification transistor 14 amplifies the potential at the floating diffusion FD and outputs a voltage according to the potential to the output signal line 16. The voltage outputted from each pixel through the output signal line 16 is outputted to a column processing circuit (vertical row processing circuit) via a readout unit. Examples of the readout circuit and the column processing circuit will be described later in detail.

The pixel reset operation is discarding the electric charge accumulated in the photoelectric conversion device 11 by turning on the transfer transistor 12 to transfer the electric charge accumulated in the photoelectric conversion device 11 to the floating diffusion FD. In this process, the reset transistor 13 is turned on to discard the electric charge left in the floating diffusion FD toward the power source in advance so that the floating diffusion FD can receive the electric charge from the photoelectric conversion device 11. Alternatively, during the period when the transfer transistor 12 remains turned on, the reset transistor 13 may concurrently be turned on to discard the electric charge directly to the power source. The series of operations described above is a "pixel reset operation."

On the other hand, in a reading operation, the reset transistor 13 is first turned on to reset the floating diffusion FD, and an output is sent to the output signal line 16 through the selection transistor 15 that was turned on when the floating diffusion FD was reset. This output is called a P-phase output. Thereafter, the transfer transistor 12 is turned on to transfer the electric charge accumulated in the photoelectric conversion device 11 to the floating diffusion FD, and the output is then sent to the output signal line 16. This output is called a D-phase output. An image signal is formed by determining the difference between the D-phase output and the P-phase output in a component outside the pixel circuit and canceling reset noise associated with the floating diffusion FD. The series of operations described above is a "pixel readout operation."

The pixel drive circuit 22 shown in FIG. 3 controls the turning on and off of the transfer transistor 12, the reset transistor 13, and the selection transistor 15 in each of the pixels in each horizontal row.

The column circuit 23 receives data in parallel from a horizontal pixel row having undergone a readout operation performed by the pixel drive circuit 22, performs $1/n$ ($n \geq 2$) thinning-out along with summing or any other suitable process, performs a column-AD process, performs parallel-serial data conversion, and transfers the resultant data to a signal processing circuit in the following stage.

The column circuit 23 includes readout circuits and column processing circuits. Each of the column processing circuits in the column circuit corresponds to the "column processing unit" of an embodiment of the invention and is a circuit provided on a column basis and performing an operation of canceling the reset noise described above, AD (analog-digital) conversion when a column-AD scheme is employed, and other processes. The term "column" used herein is a vertical pixel-unit row, each of which contains, for example, four color pixels R, Gr, Gb, and B in a Bayer layout (FIG. 4).

The thus configured solid-state imaging device is used as an image input device in a variety of portable terminals, digital still cameras, digital single lens reflex cameras, digital camcorders, and other similar apparatus. The solid-state imaging device performs a variety of readout operations in accordance with the application in which the solid-state imaging device is used as well as sequentially reading the entire pixels. For example, when it is desired to perform reading at a frame rate higher than that at which the entire pixels are sequentially read, summing and reading is performed. Summing and reading can be performed in two ways: Either thinning-out, summing, and reading in multiple horizontal rows (vertical summing and reading) or 1/n thinning-out, summing, and reading in a single horizontal row (horizontal summing and reading) is performed, and both the vertical summing and reading and the horizontal summing and reading are performed.

In the present embodiment, the vertical summing and reading is arbitrary performed (may or may not be performed). On the other hand, the CMOS sensor according to the present embodiment is characterized by the horizontal thinning-out and reading, such as the horizontal summing and reading.

Figure 4:
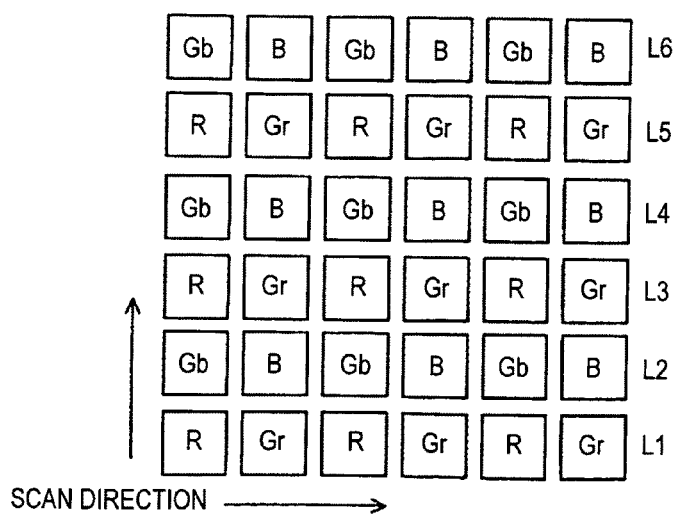
FIG. 4 shows the directions in which a pixel unit formed in a certain color layout (Bayer layout) is scanned.

In the color layout (Bayer layout) of the pixel unit 21 shown in FIG. 4, first-color pixels (R pixels) are disposed in odd horizontal rows L1, L3, L5, and so on, and second-color pixels (B pixels) are disposed in even horizontal rows L2, L4, L6, and so on. In some cases, the first-color pixels (R pixels) are disposed in even horizontal rows, and the second-color pixels are disposed in odd horizontal rows, as will be described later.

When the vertical summing and reading is performed, the pixel drive circuit 22 handles multiple horizontal rows formed of alternately disposed first-color pixel (R pixel) horizontal rows and second-color pixel (B pixel) horizontal rows (three horizontal rows, four horizontal rows, and five horizontal rows, for example) as a readout unit for a single multiple-horizontal-row thinning-out operation. The pixel drive circuit 22 uses the readout unit to thin out, sum, and read pixels in multiple horizontal rows. Since the vertical summing and reading is not essential, no detailed description thereof will be made.

[Horizontal Summing and Reading]

A description will be made of a summary of the horizontal summing and reading and the configuration of the column circuit for the same. The 1/n thinning-out in the present embodiment includes not only thinning-out along with horizontal summing but also simple reduction in the number of pixels to be read to 1/n without summing (simple thinning-out). Since the difference between the thinning-out along with summing and the simple thinning-out is only performing or not performing summing, and both the operations are conceptually 1/n thinning-out, a description will be made of the thinning-out along with summing as an example of the 1/n thinning-out.

Figure 1:
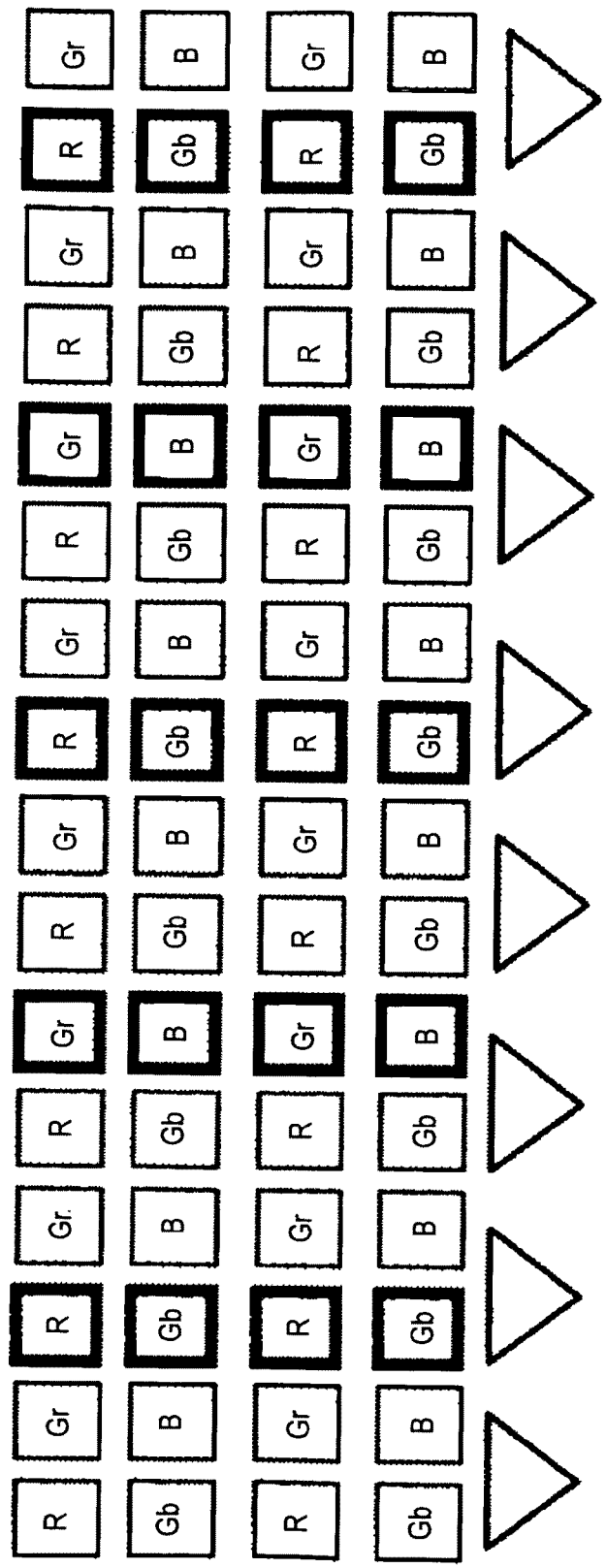
FIG. 1 is a view used to describe DESCRIPTION OF THE RELATED ART and showing a pixel unit formed in a Bayer layout with a column processing circuit disposed on a column basis.
Figure 2A:
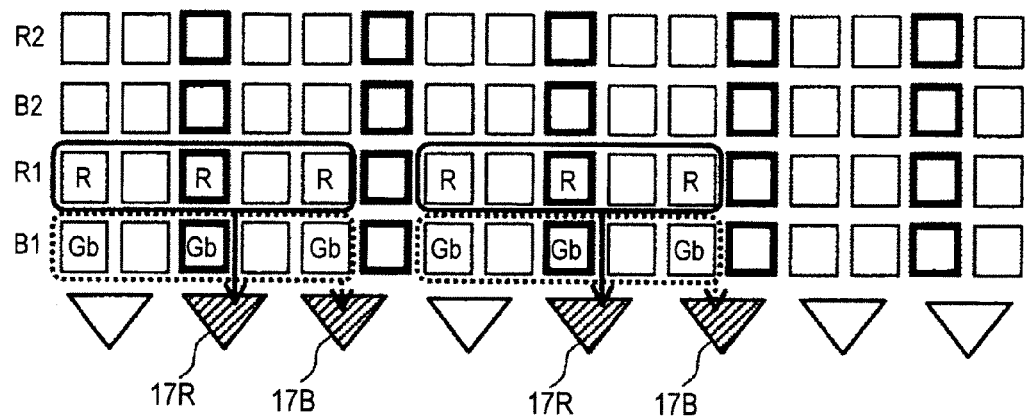
FIGS. 2A and 2B show exemplary operations described in DESCRIPTION OF THE RELATED ART in which a first-color pixel horizontal row (R horizontal row) and a second-color pixel horizontal row (B horizontal row) are processed by using different column processing circuits.
Figure 2B:
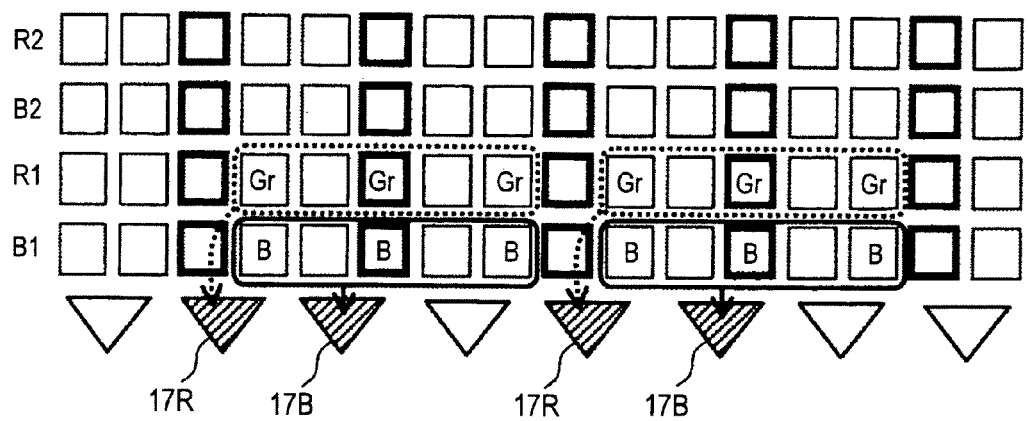
Figure 6A:
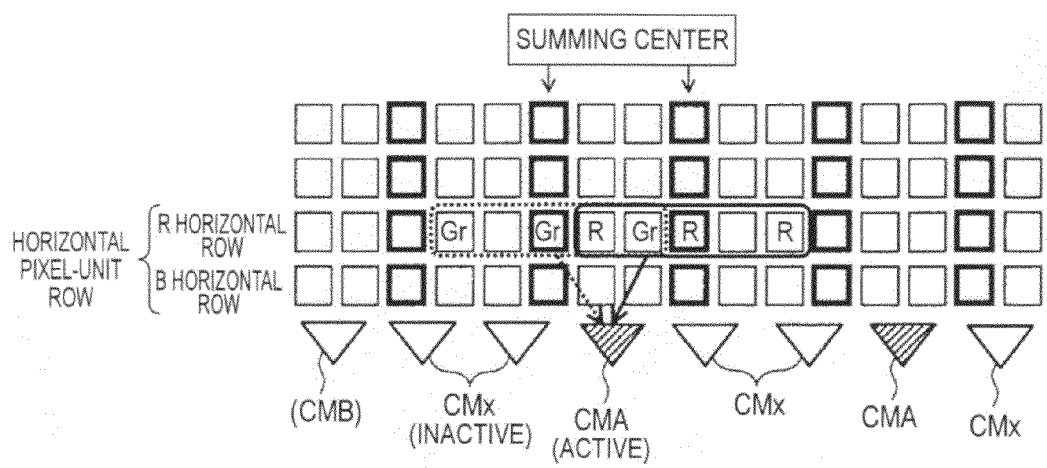
FIGS. 6A and 6B describe 1/3 thinning-out and reading performed by summing three pixels in R and B horizontal rows according to a first embodiment.
Figure 6B:
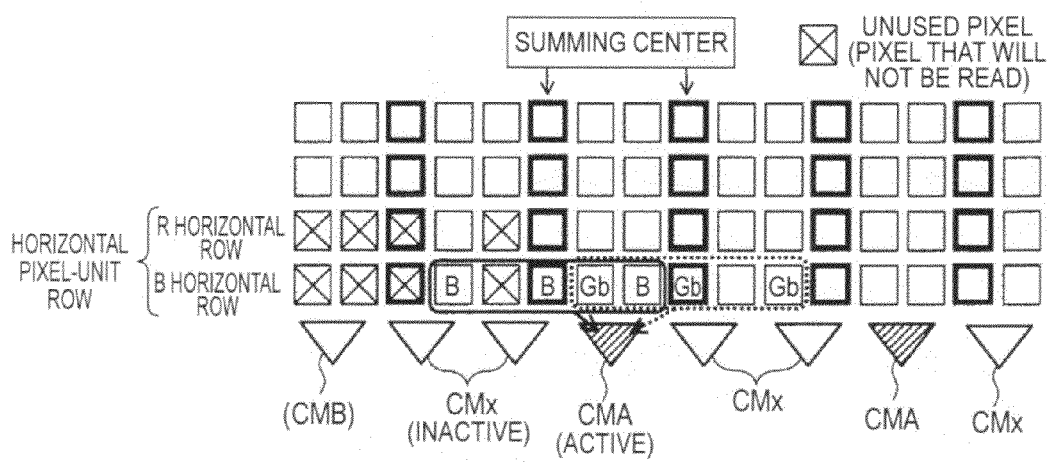

FIG. 6A describes 1/3 thinning-out and reading performed by summing three pixels in an R horizontal row. FIG. 6B describes 1/3 thinning-out and reading performed by summing three pixels in a B horizontal row. FIGS. 6A and 6B show a case where a comparator, which is the first stage of each of the column processing circuits, is disposed on a column basis in a Bayer layout. Since the color arrangement in the Bayer layout is the same as that in FIG. 1, only the pixels to be summed are labeled with their color codes.

In the present embodiment, for example, the column processing circuits are periodically energized and hence activated as follows: One column processing circuit is energized and hence activated but the following (n−1) column processing circuits are not energized or activated, in other words, one of every three column processing circuits is energized and hence activated, as shown in FIGS. 6A and 6B. In FIGS. 6A and 6B, activated comparators CMA are hatched.

In the drive method of the present embodiment, a red (R) three-pixel signal and a green (Gr) three-pixel signal are supplied to an activated comparator CMA in such a way that the supplied pixel signals are symmetric in the horizontal row direction. Although ensuring the symmetry of the pixel signals is not essential, ensuring the symmetry, even when the paths along which the pixel signals from the three pixels are supplied differ from one another, cancels the differences in a summed signal. Ensuring the symmetry is advantageous because the amplitude of the summed signal has a desired value and the phases of the summed pixel signals are the same.

A comparator is provided on a column (column of pixel units) basis in the present embodiment. Alternatively, the column processing circuits themselves may be thinned-out from the first column, that is, only one of the n columns has a column processing circuit as long as n is fixed.

On the other hand, in a configuration in which the pixel signal supply paths are switched one to another and n is changed, a comparator is disposed on a column basis, as shown in FIGS. 6A and 6B, part of the paths is connected or disconnected by the readout circuits (not shown). The paths are connected or disconnected in accordance with whether an R horizontal row or a B horizontal row is read so that the signals supplied from the pixels at a desired location is delivered to an activated comparator CMA, as shown in FIGS. 6A and 6B. No description will be made of the path control performed by the readout circuits in the present embodiment, because it will be described in detail in the following second embodiment.

The value n in 1/n thinning-out is desirably an odd number that allows the summing center to be the position of the pixels to be summed and readily ensures the symmetry, but may alternatively be an even number. In the latter case, it is preferred that the pixel signal supply path is symmetric with respect to a pixel close to the summing center.

Figure 8:
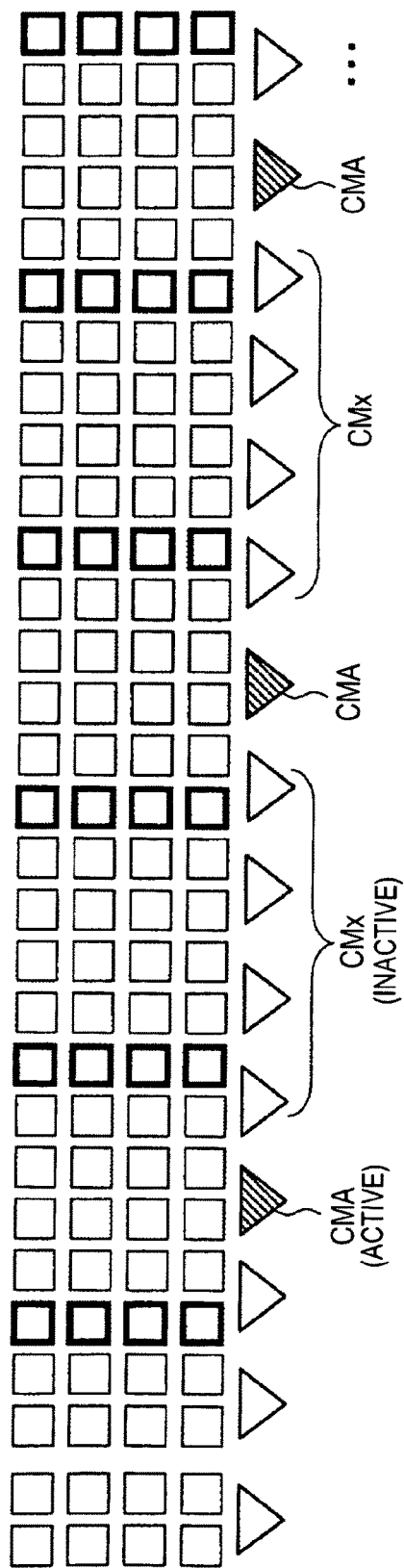
FIG. 8 describes the arrangement of active comparators for n=5.

FIGS. 8 and 9 show cases where n=5 and n=7, respectively.

On the other hand, for n=4×m+3 (m is an integer greater than or equal to zero), that is, n=3, 7, 11, and so on, the number of pixels located on the scanning origin side but unused in the summing is not negligibly small in some cases. To address the problem, irregular summing called dummy column processing may be performed to increase the amount of information to be used.

Figure 7A:
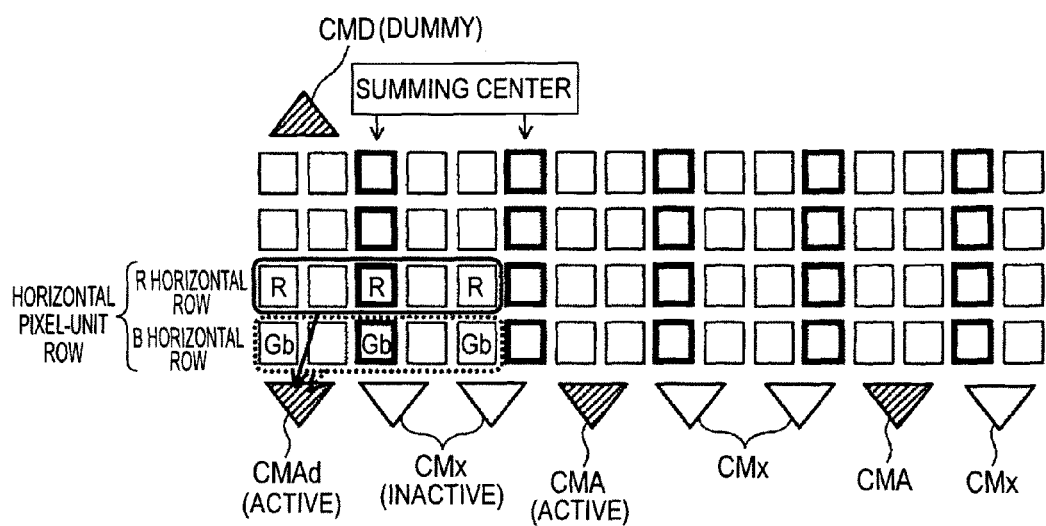
FIGS. 7A and 7B describe dummy column processing for n=3.
Figure 7B:
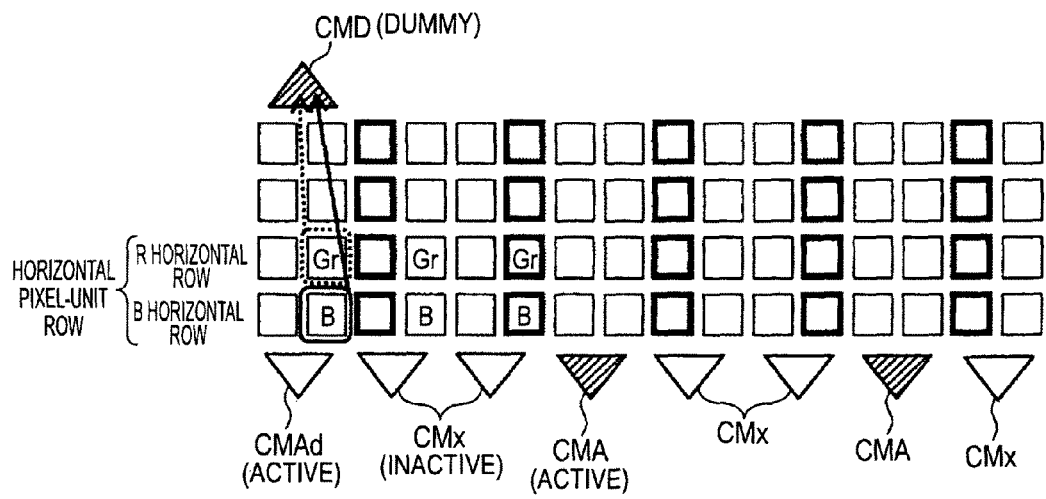

FIGS. 7A and 7B describe dummy column processing for n=3. In the dummy column processing, an R horizontal row is read by the outermost (scanning origin side) activated comparator CMAd. When a B horizontal row is read, however, only one pixel close to the activated comparator CMAd is read as it is but no summing is carried out. The reason for this is that no pixel is present on the left of the one pixel and the pixel on the right of the one pixel is used in the processes shown in FIGS. 6A and 6B and hence cannot be used because using a single pixel in two processes is prohibited.

In the dummy column processing, another comparator CMD is necessary because the R horizontal-row reading and the B horizontal-row reading are different processes. Further, since the comparator CMAd is used only in the R horizontal-row reading, the configuration of the column processing circuit containing the comparator CMAd differs from the configuration of the column processing circuit containing the comparator CMA.

As described above, the dummy column processing on one hand disadvantageously increases burden from the circuitry point of view, but on the other hand advantageously enables effective use of pixel information. It is preferable to consider the disadvantage and the advantage in a comprehensive manner to determine whether or not the dummy column processing is carried out.

For n=5 shown in FIG. 8, since a large number of inactive comparators CMx are present in the area from the scanning origin to the first activated comparator CMA, the information on the pixels close to the scanning origin is effectively used.

In the first embodiment described above, a common single column between summing centers is used to read an R horizontal row and a B horizontal row when the horizontal summing (or the simple thinning-out) is employed. As a result, the distances from the summing centers to the point where the reading is carried out are the same, whereby the reading is performed more precisely.

Further, using the column processing circuit for only one of the n columns can reduce power consumption.

When the (4×m+3) summing (n=3, 7, 11, and so on) is performed, however, it is necessary to perform the dummy column processing on the first column for each horizontal row or use a pixel arrangement starting from a B pixel instead of an R pixel. That is, in FIG. 1 and FIGS. 6A and 6B, the pixel arrangement having an upper left origin starts from an R horizontal row, followed by a B horizontal row, an R horizontal row, and so on disposed in the vertical row direction, but it is preferred that the pixel arrangement starts from a B horizontal row, followed by an R horizontal row, a B horizontal row, and so on as shown in FIG. 4. When the scanning direction and hence the scanning order (reading order) are defined as shown in FIG. 4, the reading starts from an R horizontal row in FIG. 4, whereas the reading starts from a B horizontal row in FIG. 1 and FIGS. 6A and 6B. When the scanning direction is reversed from that shown in FIG. 4, the reading starts from a B horizontal row in FIG. 4, whereas the reading starts from an R horizontal row in FIG. 1 and FIGS. 6A and 6B.

<2. Second Embodiment>

In the reading method shown in FIGS. 6A and 6B, the number of unused pixels (pixels that will not be read) is eight per a horizontal pixel-unit row or corresponds to two pixel units. There should be no unused pixel by performing the dummy column processing shown in FIGS. 7A and 7B.

A second embodiment proposes a drive method capable of reducing the number of unused pixels, for example, halving the number without performing any dummy column processing.

Figure 10A:
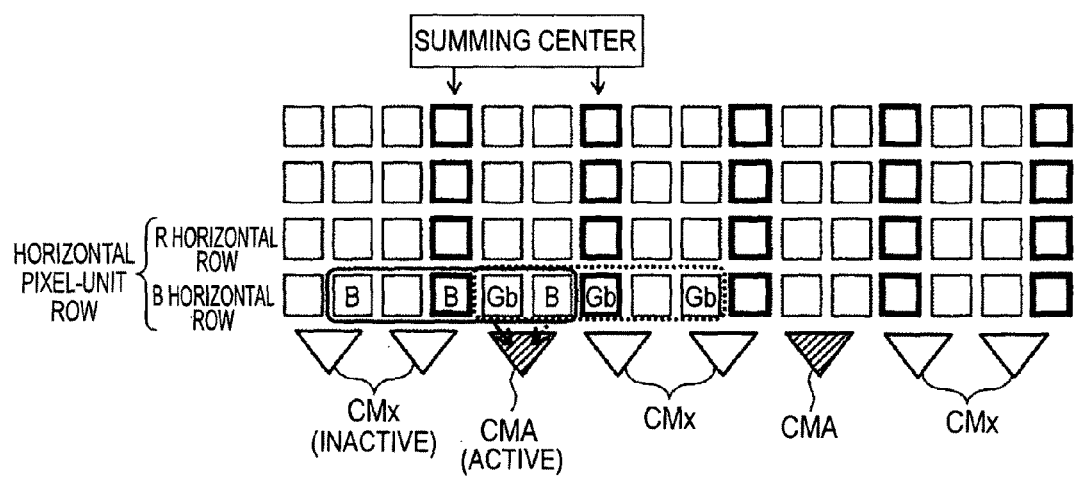
FIGS. 10A and 10B describe 1/3 thinning-out and reading performed by summing three pixels in R and B horizontal rows according to a second embodiment.
Figure 10B:
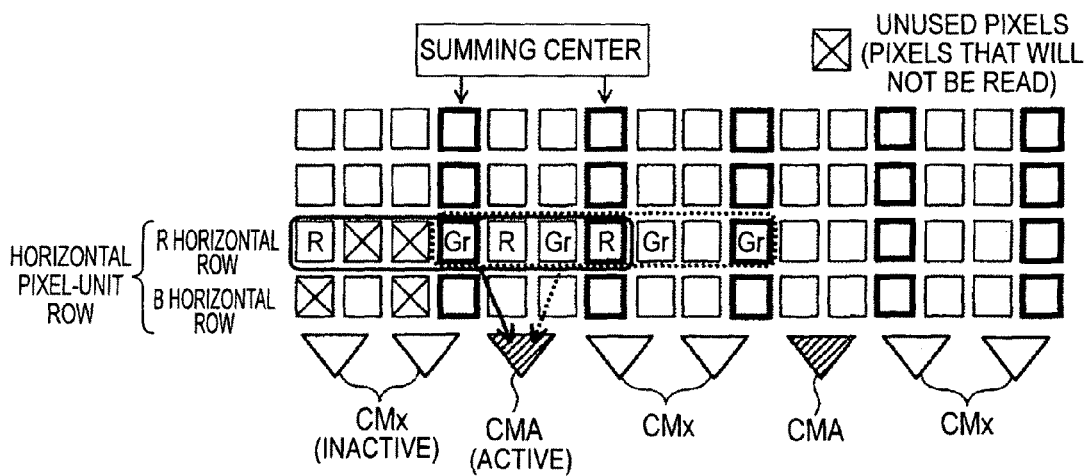

FIGS. 10A and 10B describe reading performed by summing three pixels in the second embodiment.

FIGS. 6A and 6B differ from FIGS. 10A and 10B in that two inactive comparators CMx are disposed in the two columns next to the leftmost column in the pixel array, followed by an activated comparator CMA. In this case, a comparator CMB disposed in the leftmost column works as an active comparator when the dummy column processing is performed, whereas working as an indeterminate comparator, that is, an inactive comparator, when no dummy column processing is performed.

In contrast, in FIGS. 10A and 10B, two inactive comparators CMx are disposed from the first two columns, followed by an active comparator CMA.

As a result, the number of unused pixels is four or corresponds to one pixel unit, as shown in FIG. 10B, that is, the number is one-half the number shown in FIG. 6B.

In the second embodiment, an active comparator CMA is disposed between summing centers, as in the first embodiment. That is, the following requirement in an embodiment of the invention is satisfied: "A column processing unit (column processing circuit) (to be activated) is disposed at one end (or both ends) of the vertical pixel row between a vertical pixel row containing the center of n arranged R pixels and another vertical pixel row containing the center of n arranged B pixels." The requirement is also satisfied in the first embodiment. In the requirement described above, "another vertical pixel row" corresponds to another vertical pixel-unit row in the first and second embodiments.

In this case, when a B horizontal row is read in FIG. 10A, the actual summing centers coincide with the defined summing centers shown in FIGS. 10A and 10B. When an R horizontal row is read in FIG. 10B, however, the actual summing centers are not the defined summing centers but the vertical rows closer to the comparator CMA by one vertical row from the defined summing centers. When an R horizontal row is read, neither can the summing centers be defined, nor the requirement described above is not satisfied. In FIGS. 10A and 10B, it is therefore necessary to define the summing centers in the reading process of a B horizontal row.

According to the reading method described above, it is not necessary to change the pixel arrangement or perform any special processing (dummy column processing, for example) on the first column.

[Exemplary Circuit for Summing and Reading]

Figure 11:
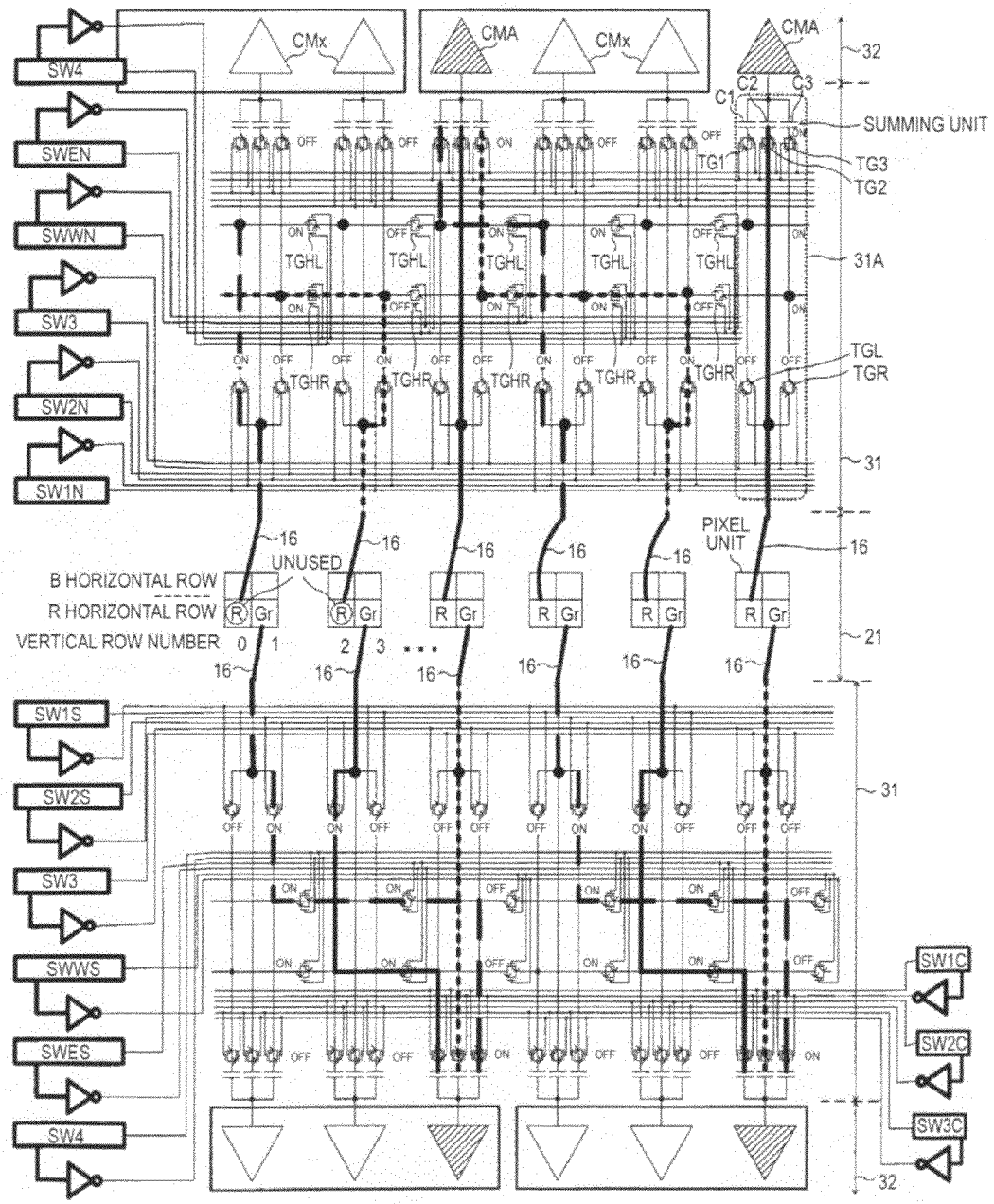
FIG. 11 shows an exemplary specific circuit for performing 1/3 thinning-out, summing, and reading of three pixels in an R horizontal row and describes the operation of the circuit.
Figure 12:
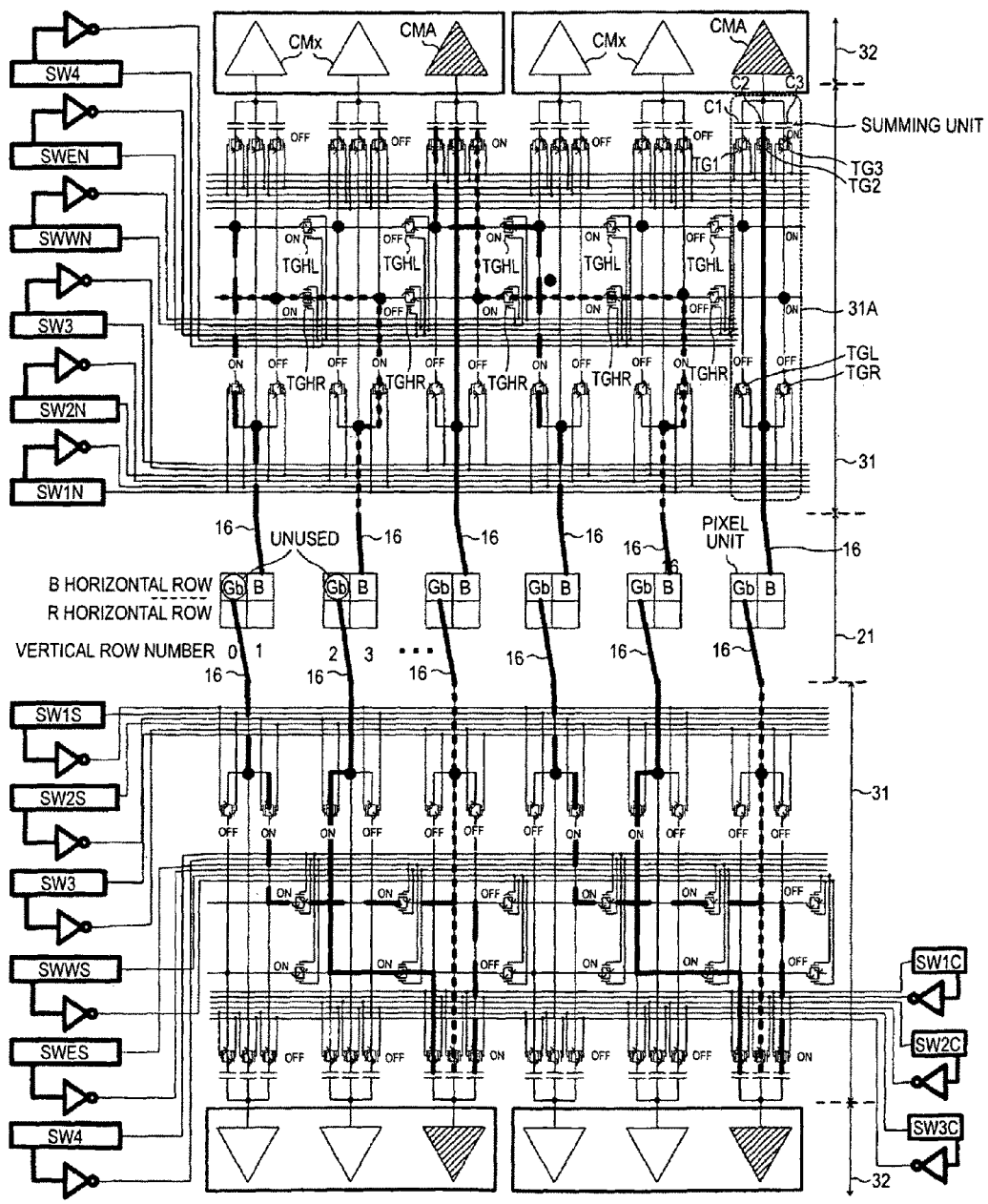
FIG. 12 shows an exemplary specific circuit for performing 1/3 thinning-out, summing, and reading of three pixels in a B horizontal row and describes the operation of the circuit.
Figure 13:
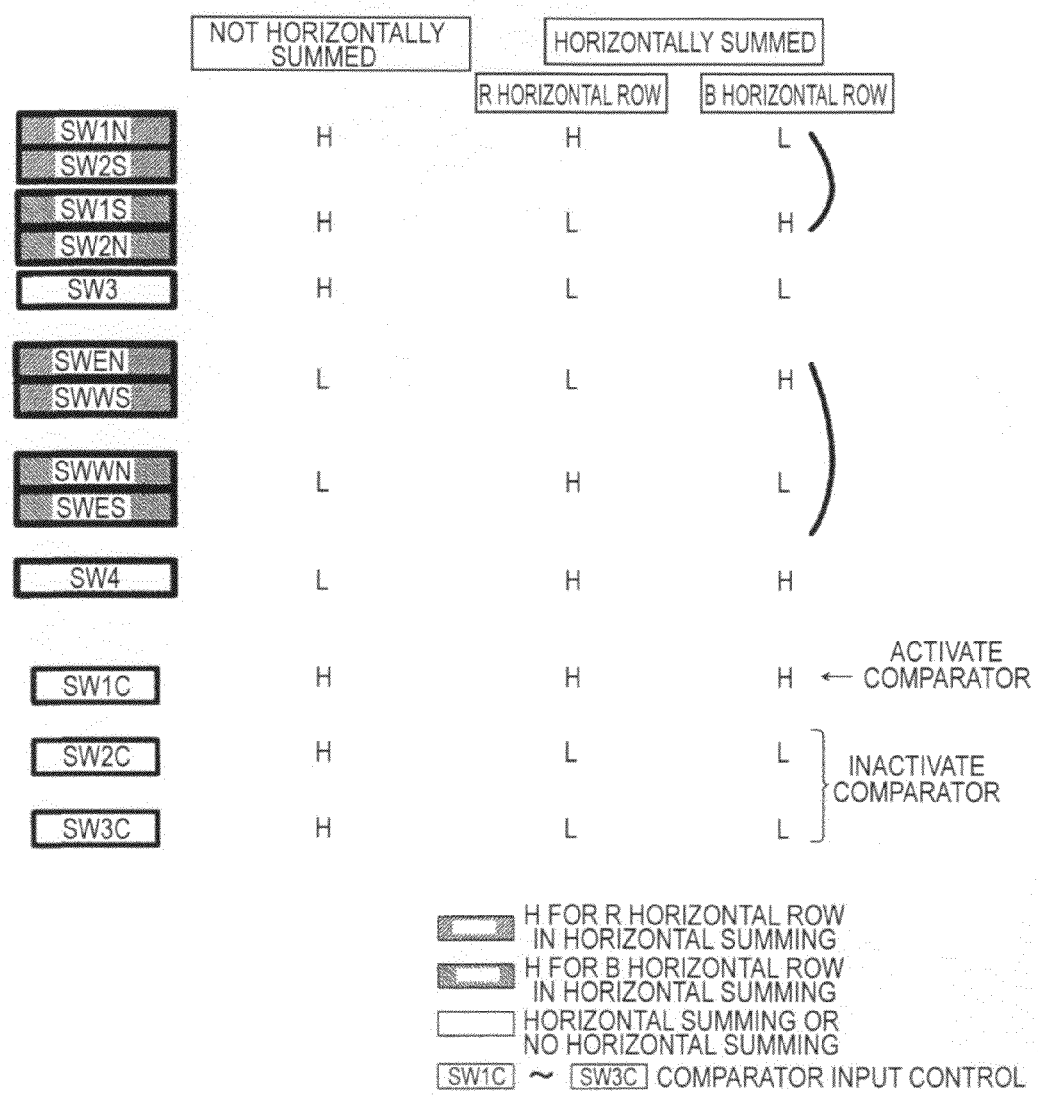
FIG. 13 is a list of logics of selection signals shown in FIGS. 11 and 12 and a selection signal controlling whether or not summing and reading is carried out.

FIGS. 11 and 12 show exemplary specific circuits for performing 1/3 thinning-out, summing, and reading. FIG. 11 shows connected paths when an R horizontal row is read, and FIG. 12 shows connected paths when a B horizontal row is read. FIG. 13 shows a list of logics ("H" or "L") of selection signals when the horizontal summing is carried out and when no horizontal summing is carried out.

In FIGS. 11 and 12, the readout circuits for summing and reading have the same configuration.

For example, in FIG. 11, one horizontal row of pixel units is shown in the pixel unit 21. In this description, the number of pixel units is six. Further, two output signal lines 16 extend from each of the pixel units in the vertical row direction. Readout circuits 31 performing summing and reading are connected to a pair of output signal lines 16 for each of the pixel units.

In FIG. 11, the pairs of readout circuits 31 are disposed in the upper and lower portions of FIG. 11 for ease of illustration. Each of the readout circuits 31 includes a readout unit 31A on a column basis. The readout circuit 31 in the upper portion of FIG. 11 includes a readout unit 31A for reading red (R) pixels (R pixels), and the readout circuit 31 in the lower portion of FIG. 11 includes a readout unit 31A for reading green (Gr) pixels (Gr pixels).

When the single column circuit 23 is used to perform reading from one side of the vertical row direction of the pixel unit 21 as shown in FIG. 3, the readout unit 31A for reading an R pixel and the readout unit 31A for reading a Gr pixel in FIG. 11 are alternately arranged in the horizontal row direction in the column circuit 23.

Alternatively, the readout unit 31A for reading an R pixel and the readout unit 31A for reading a Gr pixel can be arranged on both sides of the vertical row direction of the pixel unit 21 while the configuration shown in FIG. 11 remains unchanged. In this case, the column circuit 23 shown in FIG. 3 is necessary on both sides of the vertical row direction of the pixel unit 21.

Each of the readout units 31A includes five transfer gate circuits TG1 to TG3, TGR, and TGL and three capacitors C1 to C3 that form a summing section.

The outputs from the three capacitors C1 to C3, which form the summing section, are connected to the input of the first stage of the corresponding column processing circuit 32 (a comparator CMA or CMx in a column-AD processing unit, for example).

The transfer gate circuits TG1 to TG3 are provided in the vicinity of the summing unit (capacitors C1 to C3) and all are turned on only when the comparator CMA (hatched triangle in FIG. 11) in the column processing circuit is supplied with a power source voltage and hence activated. On the other hand, the transfer gate circuits TG1 to TG3 are turned off when the comparator CMx (open triangle in FIG. 11) in the column processing circuit is supplied with no power source voltage and hence inactivated.

The pixel signal input of the transfer gate circuit TG2 is directly connected to the corresponding output signal lines 16. On the other hand, the pixel signal input of the transfer gate circuit TG1 is connectable to the output signal line 16 via the transfer gate circuit TGL. Similarly, the pixel signal input of the transfer gate circuit TG3 is connectable to the output signal line 16 via the transfer gate circuit TGR. Each of the transfer gate circuits TGR and TGL is a circuit that directs the pixel signal (color signal) from the output signal line 16 to the right or left in accordance with a supplied selection signal.

The thus configured readout unit 31A is repeatedly arranged for each of the output signal lines 16.

In two adjacent readout units 31A, a node located at an intermediate point between the transfer gate circuits TGL and TG1 connected to each other in one of the readout units 31A is electrically connectable to that in the other readout unit 31A via a transfer gate circuit TGHL for horizontal transfer. Further, in the two adjacent readout units 31A, a node located at an intermediate point between the transfer gate circuits TGR and TG3 connected to each other in one of the readout units 31A is electrically connectable to that in the other readout unit 31A via a transfer gate circuit TGHR for horizontal transfer.

The configuration described above allows a pixel signal from the output signal line 16 in one of the readout units to be transferred in the horizontal direction (horizontal row direction) and sent to an activated comparator CMA in the other readout unit.

In the configuration described above, each of the upper readout circuits 31 is basically the same as (rotationally symmetric by 180 degrees with respect to) the corresponding lower readout circuit 31 in FIG. 11. However, different selection signals are provided to control the R-pixel and Gr-pixel reading operations separately.

Since the configuration is rotationally symmetric by 180 degrees, for example, the upper readout circuit 31 rotated around the central pixel unit in the horizontal direction by 180 degrees is superimposed on the lower readout circuit 31 in terms of the connection relationship between the transfer gate circuits. The ON and OFF operational states of the transfer gate circuits are also superimposed on (coincide with) each other except the signal names.

More specifically, in the upper readout circuits 31 for reading R pixels, the transfer gate circuits TGR and TGL in the readout unit 31A corresponding to an activated comparator CMA need to be turned off. The readout unit 31A corresponding to an activated comparator CMA is hereinafter referred to as an active column unit.

A selection signal SW3 and the inverse signal thereof (for example, inverted by an inverter and ditto as above) control PMOS and NMOS transistors in the transfer gate circuits TGR and TGL in an active column unit.

In contrast, for two inactive comparators CMx between two activated comparators CMA, the transfer gate circuits TGR and TGL in the corresponding two readout units 31A operate in a differential manner. The readout unit 31A corresponding to an inactive comparator CMx is hereinafter referred to as an inactive column unit.

More specifically, the transfer gate circuit TGR is turned on in the right inactive column unit, and the transfer gate circuit TGR is turned off in the left inactive column unit. On the other hand, the transfer gate circuit TGL is turned on in the left inactive column unit, and the transfer gate circuit TGL is turned off in the right inactive column unit.

A selection signal SW1N and the inverse signal thereof and a selection signal SW2N and the inverse signal thereof control the PMOS and NMOS transistors in the transfer gate circuits TGR and TGL in an inactive column unit.

In a single readout unit 31A (column unit), the transfer gate circuits TGHL and TGHR are driven in the same phase. In an active column unit and two inactive column units connected to one side of the active unit and supplying pixel signals thereto, two pairs of transfer gate circuits TGHL and TGHR inserted in the paths along which the pixel signals are supplied (horizontal transfer paths) are all turned on. On the other hand, the transfer gate circuits TGHL and TGHR that control the connection of the inactive column unit on the other side where no pixel signal is supplied to the active column unit are turned off.

The transfer gate circuits TGHL and TGHR described above are controlled by selection signals SWWN, SWEN, and SW4.

The capacitors C1 to C3 are typically set to have the same capacitance and sum three pixel signals (R signals or B signals) in such a way that they are combined at substantially the same rate to produce a combined (summed) pixel signal to be inputted to a comparator.

When the same combining rate is difficult to achieve due to the difference in length among the paths along which the pixel signals travel from the pixel unit 21, the capacitors C1 to C3 may have slightly different capacitance values so that the same combining rate is achieved.

The transfer gate circuits TG1 to TG3, which control the inputs to the capacitors C1 to C3, are controlled by selection signals SW1C to SW3C, as illustrated in the lower readout circuit 31 in FIG. 11. The same applies to the upper readout circuit 31 in FIG. 11.

As the selection signals that control the lower readout circuit 31 in FIG. 11, a selection signal SW1S is used instead of the selection signal SW1N and a selection signal SW2S is used instead of the selection signal SW2N. Similarly, a selection signal SWWS is used instead of the selection signal SWWN and a selection signal SWES is used instead of the selection signal SWEN. The selection signals SW3, SW4, and SW1C to SW3C are shared by the upper and lower readout circuits 31.

In the exemplary control shown in FIG. 12, a pair of control signals SW1N and SW2S, a pair of control signals SW1S and SW2N, a pair of control signals SWEN and SWWS, and a pair of selection signals SWWN and SWES have the same logical value. When summing and reading is performed on an R horizontal row and a B horizontal row, however, the pair of control signals SW1N and SW2S and the pair of control signals SW1S and SW2N are reversed in terms of logic. The pair of control signals SWEN and SWWS and the pair of selection signals SWWN and SWES are also reversed in terms of logic.

In this configuration, in the upper readout circuit 31 where summing and reading is performed on an R horizontal row, an active unit is supplied with pixel signals from the two inactive units on the right of the active unit, whereas in the lower readout circuit 31 where summing and reading is performed on a B horizontal row, an active unit is provided with pixel signals from the two inactive units on the left of the active unit, as shown in FIG. 11. In this process, the paths along which the pixel signals are supplied in the summing and reading performed on the R horizontal row and those in the summing and reading performed on the B horizontal row are horizontally symmetric with respect to the active unit. In the symmetrical pixel signal supply structure, combining the outputs from the capacitors C1 to C3 at the same proportion allows the combined (summed) signal to be free from the effect due to the difference in path length.

Further, the number of unused pixels is reduced to four, as seen from FIGS. 11 and 12.

<3. Third Embodiment>

The solid-state imaging device according to the first or second embodiment having the advantageous effects described above is applicable to an imaging device used in a digital camera and a video camcorder.

Figure 14:
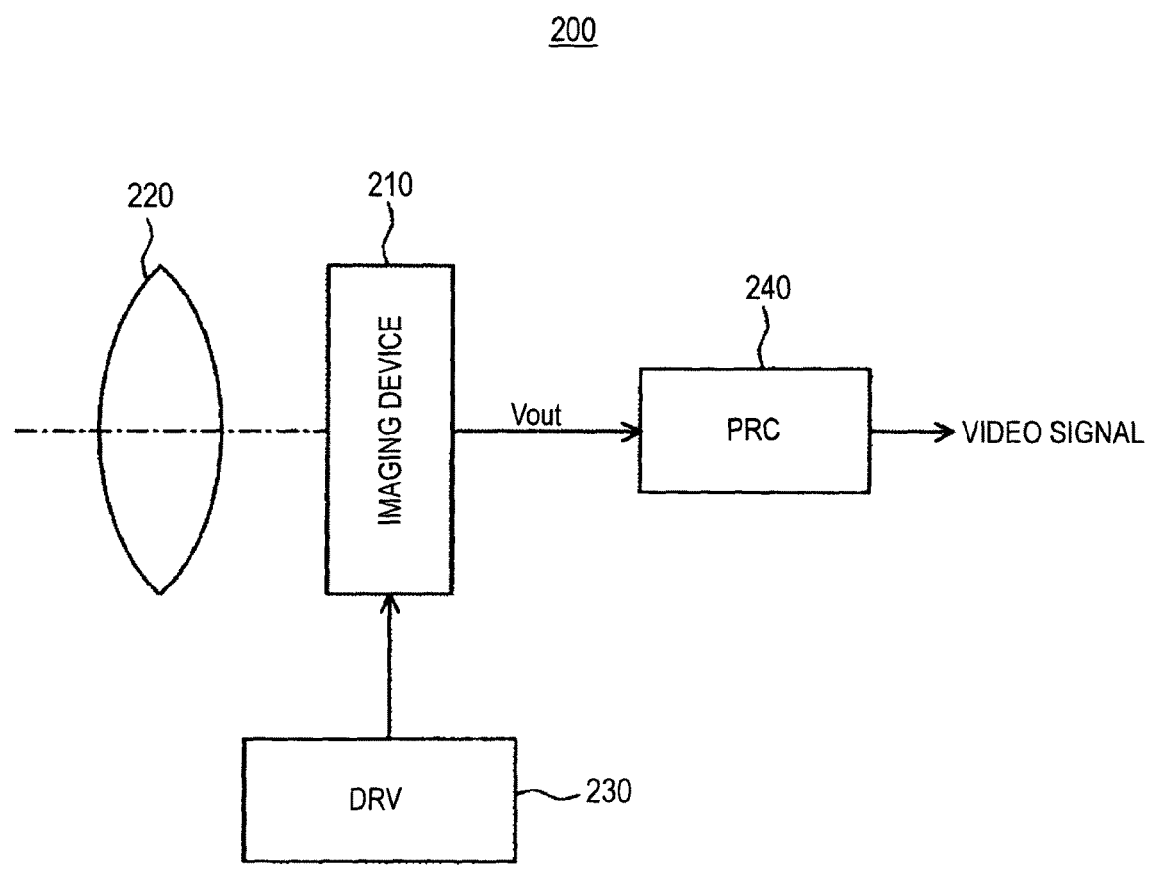
FIG. 14 is a schematic configuration diagram of a camera system according to a third embodiment.

FIG. 14 shows an example of the configuration of a camera system using the solid-state imaging device according to any of the embodiments of the invention.

The camera system 200 includes, as shown in FIG. 14, an imaging device 210, which can be the CMOS image sensor (solid-state imaging device) 20 according to any of the embodiments described above. The camera system 200 further includes an optical system that guides incident light to (focuses incident light into a subject image on) the pixel area of the imaging device 210, for example, a lens 220 that focuses the incident light (image light) on the imaging surface. The camera system 200 further includes a drive circuit (DRV) 230 that drives the imaging device 210 and a signal processing circuit (PRC) 240 that processes a signal outputted from the imaging device 210.

The drive circuit 230 includes a timing generator (not shown) that produces a variety of timing signals including a start pulse and clock pulses for driving the circuits in the imaging device 210. The drive circuit 230 drives the imaging device 210 by using predetermined timing signals.

The signal processing circuit 240 performs CDS (Correlated Double Sampling) and other signal processing on the signal outputted from the imaging device 210. The image signal processed in the signal processing circuit 240 is recorded in a memory or any other suitable recording medium. The image information recorded on the recording medium is printed by using a printer or any other similar apparatus. The image signal processed in the signal processing circuit 240 is also displayed as video images on a monitor formed of, for example, a liquid crystal display.

As described above, a high-precision camera system can be achieved by incorporating the imaging device (CMOS image sensor) 20 described above as the imaging device 210 in a digital still camera or any other similar imaging apparatus.

The present application contains subject matter related to that disclosed in Japanese Priority Patent Application JP 2009-107141 filed in the Japan Patent Office on Apr. 24, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a pixel unit in which pixels, each of which converts light into a pixel signal and accumulates the pixel signal in accordance with a light exposure period, are arranged in a predetermined color layout and first-color pixel horizontal rows containing first-color pixels and second-color pixel horizontal rows containing second-color pixels are alternately arranged in a vertical row direction;
readout units that select n (n≧2) single-color pixel signals from the first-color or second-color pixels in the first-color or second-color pixel horizontal rows, perform 1/n thinning-out on the selected n pixel signals to reduce the number of pixel signals to 1/n, and read the resultant pixel signal for each of the colors; and
n column processing units, one of n column processing units being activated to perform column processing on the pixel signals having undergone the 1/n thinning-out, wherein only one of the n column processing units works not only as a processing unit that performs column processing on the one first-color pixel signal read by the readout units from the n first-color pixel signals but also as a processing unit that performs column processing on the one second-color pixel signal read by the readout units from the n second-color pixel signals.

2. The solid-state imaging device according to claim 1, wherein each of the column processing units is disposed at one end or both ends of a vertical pixel row positioned between a vertical pixel row containing the center of n arranged pixels that output the n first pixel signals selected to be summed by the readout units and a vertical pixel row containing the center of n arranged pixels that output the n second pixel signals selected to be summed by the readout units in another horizontal pixel row.

3. The solid-state imaging device according to claim 1, wherein each of the column processing units is disposed at one end or both ends of a vertical pixel row between a vertical pixel row containing a pixel that outputs the one first pixel signal read by the readout units from the n first pixel signals in the 1/n thinning-out operation and a vertical pixel row containing a pixel that outputs the one second pixel signal read by the readout units from the n second pixel signals in the 1/n thinning-out operation.

4. The solid-state imaging device according to claim 2, wherein each of the column processing units includes
a summing section configured to sum the n first pixel signals or the n second pixel signals selected by the readout units, and
a comparator configured to compare the summed analog first or second pixel signal with a threshold value and converts the analog pixel signal into a digital pixel signal, and
wherein the comparator is disposed at one end or both ends of the vertical pixel row between the summing centers.

5. The solid-state imaging device according to claim 3, wherein each of the column processing units includes
a comparator configured to compare the analog first or second pixel signal having undergone the 1/n thinning-out with a threshold value and converts the analog pixel signal into a digital pixel signal, and
wherein the comparator is disposed at one end or both ends of the vertical pixel row between the pixels having undergone thinning-out and reading.

6. The solid-state imaging device according to claim 1,
wherein the readout units read the second-color pixel horizontal rows and then the first-color pixel horizontal rows when n is (4×m+3 (m is an integer greater than or equal to zero)), whereas reading the first-color pixel horizontal rows and then the second-color pixel horizontal rows when n is not (4×m+3).

7. The solid-state imaging device according to claim 1,
wherein the color layout of the pixel unit is a Bayer layout in which a color layout unit formed of two horizontal rows and two vertical rows is repeatedly disposed, one of the two horizontal rows being the first-color pixel horizontal row including the first-color red pixels and the other horizontal row being the second-color pixel horizontal row including the second-color blue pixels.

8. A method for driving a solid-state imaging device, the method comprising the steps of:
using a pixel unit in which pixels, each of which converts light into a pixel signal and accumulates the pixel signal in accordance with a light exposure period, are arranged in a predetermined color layout and first-color pixel horizontal rows containing first-color pixels and second-color pixel horizontal rows containing second-color pixels are alternately arranged in a vertical row direction to select n (n≧2) single-color pixel signals from the first-color or second-color pixels in the first-color or second-color pixel horizontal rows in the pixel unit,
performing 1/n thinning-out on the selected n pixel signals to reduce the number of pixel signals to 1/n for each of the colors and reading the resultant pixel signals; and
using only one of n column processing units to perform column processing on the one first pixel signal read by readout units from the n first pixel signals of the first color outputted from the first-color pixel horizontal rows and column processing on the one second pixel signal read by the readout units from the n second pixel signals of the second color outputted from the second-color pixel horizontal rows.

9. A camera system comprising:
a solid-state imaging device;
an optical system that forms a subject image on the solid-state imaging device; and
a signal processing circuit that processes an image signal outputted from the solid-state imaging device,
the solid-state imaging device including
a pixel unit in which pixels, each of which converts light into a pixel signal and accumulates the pixel signal in accordance with a light exposure period, are arranged in a predetermined color layout and first-color pixel horizontal rows containing first-color pixels and second-color pixel horizontal rows containing second-color pixels are alternately arranged in a vertical row direction,
readout units that select n (n≧2) single-color pixel signals from the first-color or second-color pixels in the first-color or second-color pixel horizontal rows, perform 1/n thinning-out on the selected n pixel signals to reduce the number of pixel signals to 1/n, and read the resultant pixel signal for each of the colors, and
n column processing units, only one of n column processing units being activated to perform column processing on the pixel signals having undergone the 1/n thinning-out,
wherein one of the n column processing units works not only as a processing unit that performs column processing on the one first-color pixel signal read by the readout units from the n first-color pixel signals but also as a processing unit that performs column processing on the one second-color pixel signal read by the readout units from the n second-color pixel signals.

10. The method for driving the solid-state imaging device according to claim 8, further comprising positioning each of the column processing units at one end or both ends of a vertical pixel row positioned between a vertical pixel row containing the center of n arranged pixels that output the n first pixel signals selected to be summed by the readout units and a vertical pixel row containing the center of n arranged pixels that output the n second pixel signals selected to be summed by the readout units in another horizontal pixel row.

11. The method for driving the solid-state imaging device according to claim 8, further comprising positioning each of the column processing units at one end or both ends of a vertical pixel row between a vertical pixel row containing a pixel that outputs the one first pixel signal read by the readout units from the n first pixel signals in the 1/n thinning-out operation and a vertical pixel row containing a pixel that outputs the one second pixel signal read by the readout units from the n second pixel signals in the 1/n thinning-out operation.

12. The method for driving the solid-state imaging device according to claim 10,
wherein each of the column processing units includes
a summing section configured to sum the n first pixel signals or the n second pixel signals selected by the readout units, and
a comparator configured to compare the summed analog first or second pixel signal with a threshold value and converts the analog pixel signal into a digital pixel signal, and
wherein the comparator is disposed at one end or both ends of the vertical pixel row between the summing centers.

13. The method for driving the solid-state imaging device according to claim 11,
wherein each of the column processing units includes
a comparator configured to compare the analog first or second pixel signal having undergone the 1/n thinning-out with a threshold value and converts the analog pixel signal into a digital pixel signal, and
wherein the comparator is disposed at one end or both ends of the vertical pixel row between the pixels having undergone thinning-out and reading.

14. The method for driving the solid-state imaging device according to claim 8, further comprising reading, by the readout units, the second-color pixel horizontal rows and then the first-color pixel horizontal rows when n is (4×m+3 (m is an integer greater than or equal to zero)), whereas reading the first-color pixel horizontal rows and then the second-color pixel horizontal rows when n is not (4×m+3).

15. The method for driving the solid-state imaging device according to claim 8,
wherein the color layout of the pixel unit is a Bayer layout in which a color layout unit formed of two horizontal rows and two vertical rows is repeatedly disposed, one of the two horizontal rows being the first-color pixel horizontal row including the first-color red pixels and the other horizontal row being the second-color pixel horizontal row including the second-color blue pixels.

16. The camera system according to claim 9,
wherein each of the column processing units is disposed at one end or both ends of a vertical pixel row positioned between a vertical pixel row containing the center of n arranged pixels that output the n first pixel signals selected to be summed by the readout units and a vertical pixel row containing the center of n arranged pixels that output the n second pixel signals selected to be summed by the readout units in another horizontal pixel row.

17. The camera system according to claim 9, wherein each of the column processing units is disposed at one end or both ends of a vertical pixel row between a vertical pixel row containing a pixel that outputs the one first pixel signal read by the readout units from the n first pixel signals in the 1/n thinning-out operation and a vertical pixel row containing a pixel that outputs the one second pixel signal read by the readout units from the n second pixel signals in the 1/n thinning-out operation.

18. The camera system according to claim 9, wherein each of the column processing units includes
   a summing section configured to sum the n first pixel signals or the n second pixel signals selected by the readout units, and
   a comparator configured to compare the summed analog first or second pixel signal with a threshold value and converts the analog pixel signal into a digital pixel signal, and
   wherein the comparator is disposed at one end or both ends of the vertical pixel row between the summing centers.

19. The camera system according to claim 9, wherein each of the column processing units includes
   a comparator configured to compare the analog first or second pixel signal having undergone the 1/n thinning-out with a threshold value and converts the analog pixel signal into a digital pixel signal, and
   wherein the comparator is disposed at one end or both ends of the vertical pixel row between the pixels having undergone thinning-out and reading.

20. The camera system according to claim 9, wherein the readout units read the second-color pixel horizontal rows and then the first-color pixel horizontal rows when n is (4×m+3 (m is an integer greater than or equal to zero)), whereas reading the first-color pixel horizontal rows and then the second-color pixel horizontal rows when n is not (4×m+3).

* * * * *